(12) United States Patent
Hara et al.

(10) Patent No.: US 8,884,160 B2
(45) Date of Patent: Nov. 11, 2014

(54) BOX MAIN BODY

(75) Inventors: Yasuhiro Hara, Makinohara (JP);
Takuya Nakayama, Makinohara (JP);
Mitsuru Saito, Makinohara (JP)

(73) Assignee: Yazaki Corporation, Tokyo (JP)

( * ) Notice: Subject to any disclaimer, the term of this patent is extended or adjusted under 35 U.S.C. 154(b) by 50 days.

(21) Appl. No.: 13/529,241

(22) Filed: Jun. 21, 2012

(65) Prior Publication Data

US 2012/0327562 A1 Dec. 27, 2012

(30) Foreign Application Priority Data

Jun. 21, 2011 (JP) ................................ 2011-137135

(51) Int. Cl.
*H02G 3/08* (2006.01)
*H02B 1/26* (2006.01)
*B60R 16/023* (2006.01)

(52) U.S. Cl.
CPC ................................ *B60R 16/0238* (2013.01)
USPC ............. 174/50; 361/622; 361/601; 361/752; 361/759; 220/3.94

(58) Field of Classification Search
USPC .............. 174/50, 520, 59, 135, 138 F, 58, 63; 439/76.2, 535, 76.1, 34, 949, 213, 439/620.27, 654, 890; 220/806, 835, 849; 361/641, 104, 600, 601, 622, 752, 759; 248/906
See application file for complete search history.

(56) References Cited

U.S. PATENT DOCUMENTS

| 5,295,842 | A | * | 3/1994 | Ozaki et al. | 439/76.2 |
|---|---|---|---|---|---|
| 5,370,551 | A | * | 12/1994 | Data | 439/487 |
| 5,515,988 | A | * | 5/1996 | Oda | 220/3.8 |
| 6,659,792 | B2 | * | 12/2003 | Saka et al. | 439/367 |
| 7,642,452 | B2 | * | 1/2010 | Kanazawa et al. | 174/50 |
| 8,378,211 | B2 | * | 2/2013 | Oka et al. | 174/50 |
| 2003/0000720 | A1 | * | 1/2003 | Sato | 174/50 |
| 2003/0136780 | A1 | * | 7/2003 | Sato et al. | 220/3.8 |
| 2004/0051399 | A1 | * | 3/2004 | Hara | 307/149 |
| 2006/0211300 | A1 | * | 9/2006 | Kubota et al. | 439/535 |
| 2007/0010112 | A1 | * | 1/2007 | Makino | 439/76.2 |
| 2009/0191728 | A1 | * | 7/2009 | Kubota et al. | 439/76.2 |
| 2009/0197477 | A1 | * | 8/2009 | Sugiura et al. | 439/721 |
| 2010/0270051 | A1 | * | 10/2010 | Mizukami | 174/50 |
| 2010/0307814 | A1 | * | 12/2010 | Aoki et al. | 174/520 |
| 2010/0326692 | A1 | * | 12/2010 | Ozawa et al. | 174/50.52 |
| 2011/0043969 | A1 | * | 2/2011 | Shiraiwa et al. | 361/624 |
| 2012/0097693 | A1 | * | 4/2012 | Takeuchi et al. | 220/810 |

FOREIGN PATENT DOCUMENTS

| JP | 10-223330 A | 8/1998 |
|---|---|---|
| JP | 2000-114751 A | 4/2000 |
| JP | 2004-056968 A | 2/2004 |

* cited by examiner

*Primary Examiner* — Robert J Hoffberg
*Assistant Examiner* — Michael Matey
(74) *Attorney, Agent, or Firm* — Edwards Wildman Palmer LLP

(57) ABSTRACT

A box main body which can smoothly attach cover members each other and prevent generation of abnormal noise is provided. An electric junction box has the box main body including two covers attached to each other and an electric power distribution unit. The box main body has two covers attached to each other. Furthermore, the box main body has a thin portion arranged in the inner wall of the upper cove, and a tapered portion projecting from a bottom surface of the thin portion toward the peripheral wall of the lower cover, and gradually tapering toward the peripheral wall of the lower cover.

4 Claims, 5 Drawing Sheets

BOX MAIN BODY

CROSS REFERENCE TO RELATED APPLICATIONS

This application is related to three co-pending applications: "ELECTRICAL JUNCTION BOX" filed even date herewith in the names of YASUHIRO HARA, TAKUYA NAKAYAMA and MITSURU SAITO which claims priority to Japanese Application No. 2011-137134 filed Jun. 21, 2011; "ELECTRIC JUNCTION BOX" filed even date herewith in the names of YASUHIRO HARA, TAKUYA NAKAYAMA and MITSURU SAITO which claims priority to Japanese Application No. 2011-137132 filed Jun. 21, 2011; and "ELECTRIC JUNCTION BOX" filed even date herewith in the names of YASUHIRO HARA, TAKUYA NAKAYAMA and MITSURU SAITO which claims priority to Japanese Application No. 2011-137133 filed Jun. 21, 2011; which applications are assigned to the assignee of the present application and all three incorporated by reference herein.

The priority application Number Japan Patent Application No. 2011-137135 upon which this patent application is based is hereby incorporated by reference.

TECHNICAL FIELD

The present invention relates to an electric junction box mounted on a vehicle as a moving object.

BACKGROUND OF THE INVENTION

Various electronic device, for example in general, lamps such as a head lamp and a tail lamp, and motors such as a starter motor and a motor for air conditioners, are mounted on a vehicle as a moving object.

The vehicle arranges an electric junction box in a suitable place so as to supply various electronic devices with electric power. The electric junction box is constructed by assembling various type electric circuits of a lot of fuses and relays.

Incidentally, the electric junction box has a fuse, a relay, a bus bar and the like. So, the electric junction box is referred to as a fuse block, a relay box, or a junction block. In this description, the fuse block, the relay box and the junction block are collectively called the electric junction box hereafter.

A conventional electric junction box has a box main body, and an electric power distribution unit received in the box main body. The box main body is formed in a box-shape, and has a lower cover and an upper cover. The lower and upper covers are installed each other, and receive the electric power distribution unit after being attached to each other. Furthermore, the lower and upper covers are made of insulating synthetic resin, and injection-molded. One of the lower and upper covers has a locking portion, and the other has a locking receiving portion.

The electric power distribution unit has a printed-wiring board, a plurality of connectors mounted on the printed-wiring board, a fuse holding portion for maintaining the connectors mounted on the printed-wiring board, and a plurality of relays mounted on the printed-wiring board. A conductor pattern of the printed-wiring board is electrically connected to each terminal of the connector, the fuse, and the relay based on a predetermined pattern.

The connector is inserted into a through hole penetrating through the outer wall of the box main body, and exposed outside of the box main body. At least one of the plurality of connectors is fitted in a connector attached to a terminal of a supply cable connected to an electric power supply of a battery or electric generator mounted on a vehicle. The other connectors are fitted in a connector attached to a terminal of a wiring harness connected to various electric devices mounted on the vehicle.

The fuse holding portion is inserted into the through hole penetrating through the outer wall of the box main body, and exposed outside of the box main body. Furthermore, the fuse holding portion holds a plurality of fuses. The relay is mounted on the printed-wiring board, and received in the box main body.

The above conventional electric junction box divides electric power supplied from the connector connected to the electric power supply with the conductor pattern of the printed-wiring board, and distributes the electric power to various electric devices through an electric wire of the wiring harness after the electric power is supplied to the fuse and the relay.

The above conventional electric junction box assembles the upper and lower covers to each other by fitting the locking portion to the locking receiving portion. In order to smoothly fit the locking portion to the locking receiving portion, the conventional electric junction box has a moderate space between them. For this reason, in the conventional electric junction box, the covers are moved by vibration when running a vehicle, and they collide and separate with each other repeatedly. As a result, abnormal noise generates.

Accordingly, an object of the present invention is to provide a box main body which can smoothly attach the cover members, and prevent abnormal noise.

SUMMARY OF THE INVENTION

In order to solve the above problem and attain the above objective, a box main body including two cover members attached to each other of the present invention has a thin portion arranged in a wall of one cover member, the wall being overlapped with a wall of the other cover member; and a tapered portion projecting from a bottom surface of the thin portion of the one cover member toward the wall of the other cover member, and gradually tapering toward the wall of the other cover member.

Furthermore, the thin portion and the tapered portion are arranged in an inner wall of the one cover member, and an outer wall of the other cover member is sandwiched between the inner wall of the one cover member and an outer wall of the one cover member.

Furthermore, an electric junction box of the present invention has the box main body described above, and an electric power distribution unit received in the box main body.

According to the box main body of the present invention, the tapered portion interfering with the wall of the other cover member is arranged in the wall of one cover member. For this reason, when the cover members are attached to each other, the tip portion of the tapered portion is cut.

Furthermore, the tapered portion is arranged in the bottom surface of the thin portion. As a result, when the tip portion of the tapered portion comes into contact with the wall of the other cover member, the thin portion is elastically-deformed so that the bottom surface separates from the wall of the other cover member.

Furthermore, the thin portion and the tapered portion are arranged in the inner wall not having a locking portion and a locking receiving portion which are engaged with each other. For this reason, when the cover members are attached to each other, the wall having the locking portion and the locking receiving portion is prevented from being bent even if the tip portion of the tapered portion interferes with the wall of the other cover member.

According to the electric junction box of the present invention, the above box main body is arranged. Therefore, when the cover members are attached to each other, the thin portion is elastically-deformed so that the tip portion of the tapered portion is cut and the bottom surface separates from the wall of the other cover member.

Effect of the Invention

According to the present invention, when the cover members are attached to each other, the tip portion of the tapered portion is cut. Thus, the cover members attached to each other can be prevented from moving.

Furthermore, when the cover members are attached to each other, the thin portion is elastically-deformed so that the bottom surface separates from the other cover member. Therefore, force required for bring the cover members close to each other can be controlled, and assembling of the cover members can be easily performed by locating the tapered portion.

Thus, the cover members can be smoothly attached to each other, and abnormal noise can be prevented from being generated.

Furthermore, when the cover members are attached to each other, the wall having the locking portion and the locking receiving portion can be prevented from being bent. As a result, the box main body of the present invention can avoid the overlapped portion in which the locking portion and the locking receiving portion are overlapped from reducing. In addition, the cover members can be prevented from accidentally separating.

The above and other objects and features of this invention will become more apparent from the following description taken in conjunction with the accompanying drawings.

DESCRIPTION OF THE PREFERRED EMBODIMENT

In the following, an electric junction box according to an embodiment of the present invention will be explained with reference to FIGS. 1 to 8. The electric junction box 1 shown in FIG. 1 in the embodiment is mounted on a vehicle as a moving object.

Figure 1:
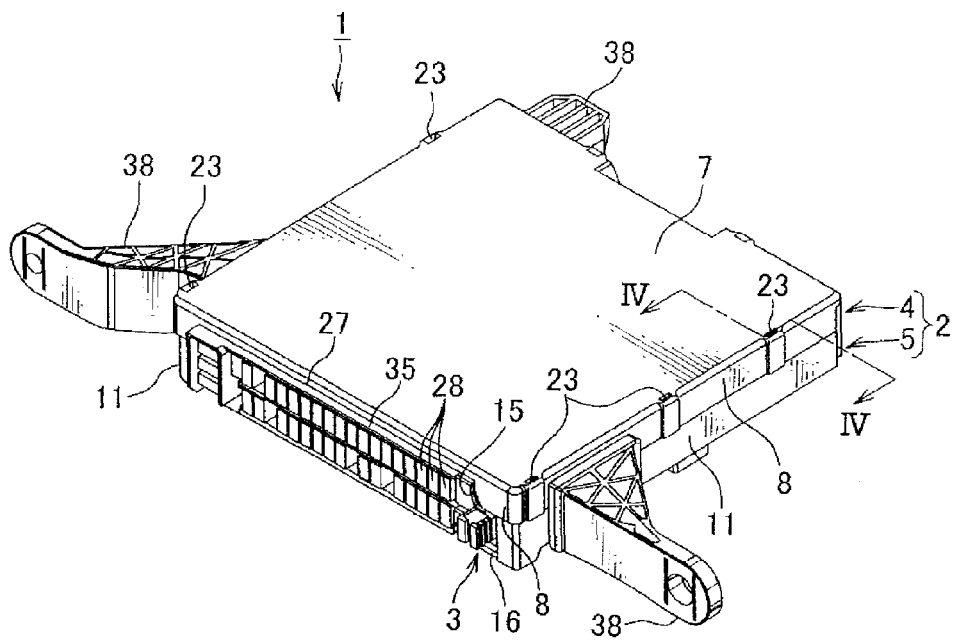
FIG. 1 is a perspective view of an electric junction box according to an embodiment of the present invention.
Figure 3:
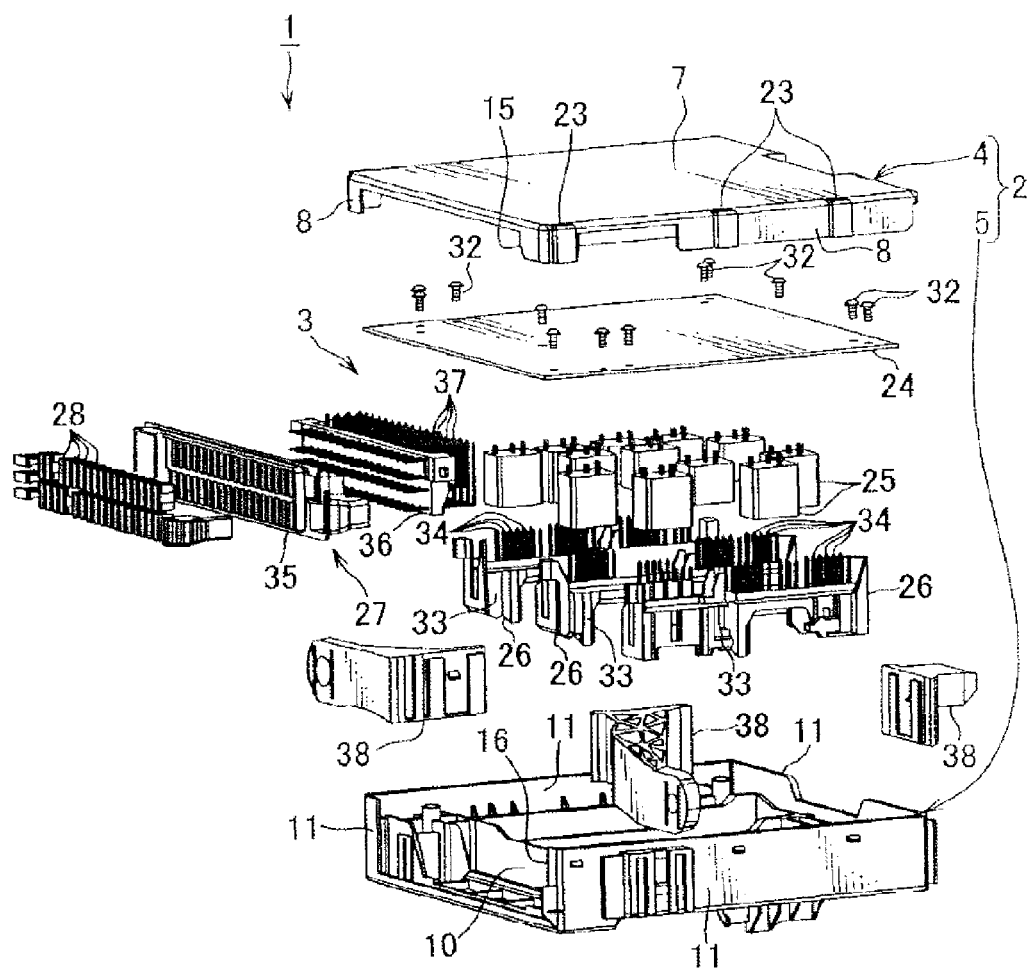
FIG. 3 is an exploded perspective view of the electric junction box in FIG. 1.

As shown in FIGS. 1 and 3, the electric junction box 1 has a box main body 2 and an electric power distribution unit 3 shown in FIG. 3. In the embodiment of the present invention, the thickness direction Z is a direction in which an upper cover 4 and a lower cover 5 in the box main body 2 are overlapped each other, and the width direction X is a direction intersecting with the thickness direction Z. In the width direction X, a plurality of fuses 28 are arranged. Furthermore, the longitudinally direction is a direction intersecting with the thickness direction Z and the width direction X.

Figure 2:
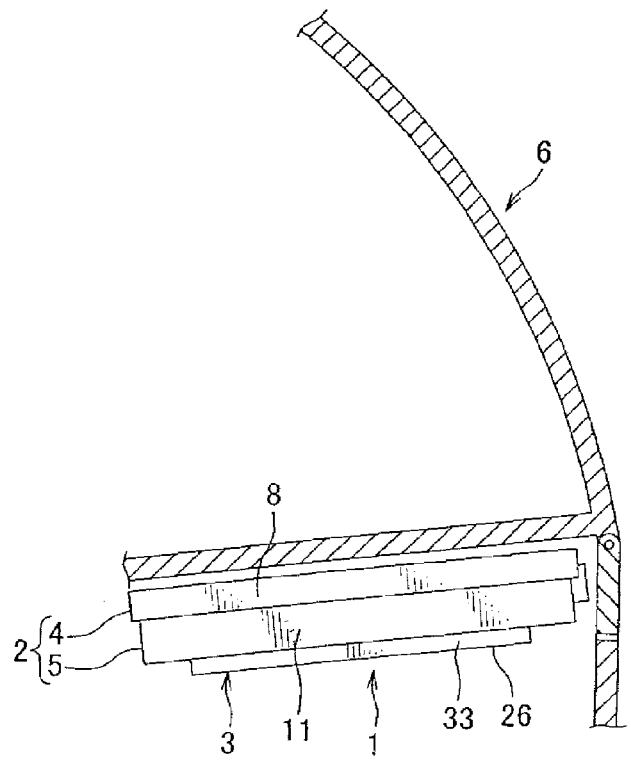
FIG. 2 is an explanatory diagram showing a state attaching the electric junction box in FIG. 1 to a vehicle.

As shown in FIG. 2, the electric junction box 1 of the embodiment of the present invention is attached to a lower portion of a center console 6 of the vehicle with a state in which the thickness direction Z is located parallel to a vertical direction. In drawings, the thickness direction Z slightly inclines toward the vertical direction so that the electric junction box 1 is placed downward according to a front of the vehicle. In addition, the upper cover 4 is overlapped with the upper side of the lower cover 5 along a direction perpendicular to the surface of a metal substrate 24 described below.

The box main body 2 is formed in a box-shape, and has the upper cover 4 and the lower cover 5 installed in the upper cover 4. The upper cover 4 and the lower cover 5 are made of insulating synthetic resin, and formed by common injection-molding. The upper cover 4 and the lower cover 5 correspond to a cover member in claims.

Figure 4:
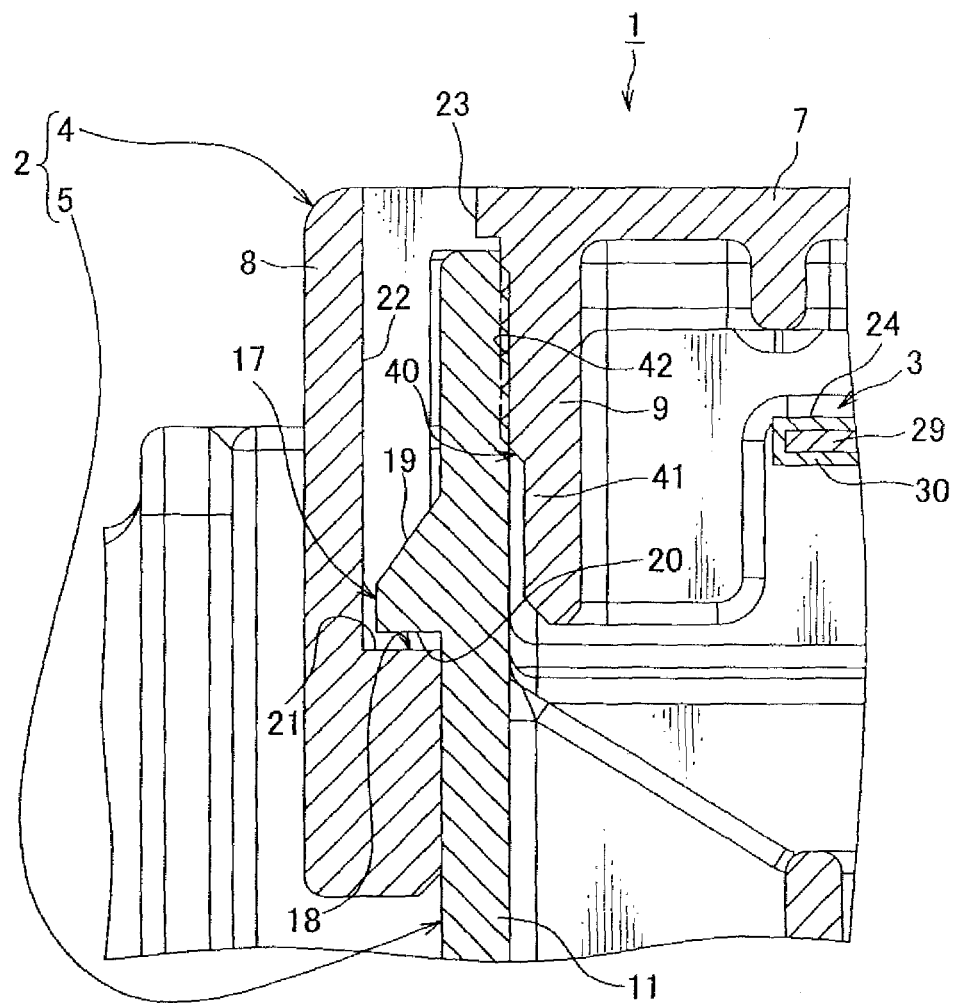
FIG. 4 is a cross-sectional view taken along the line IV-IV in FIG. 1.
Figure 5:
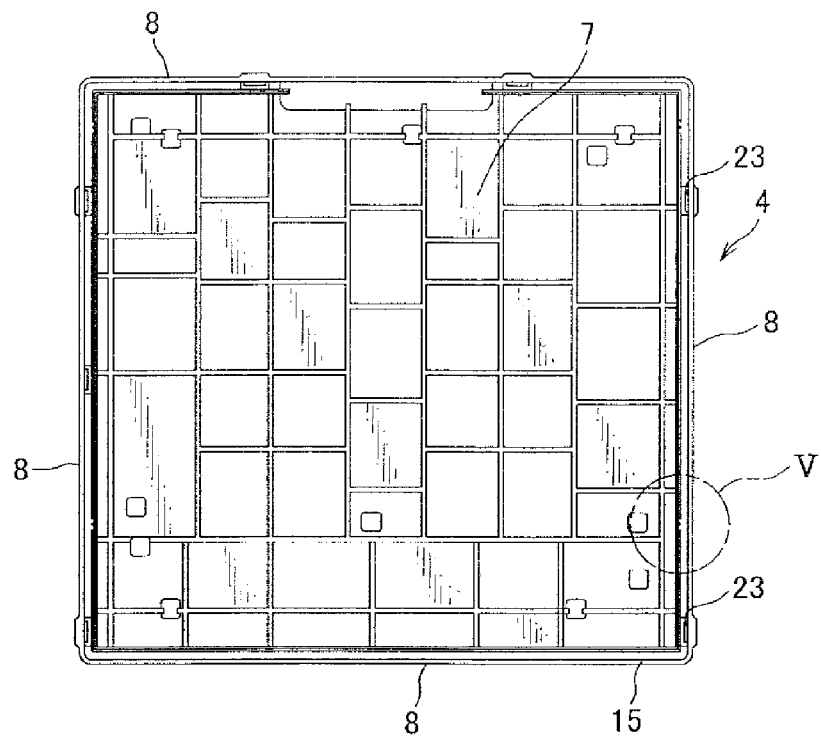
FIG. 5 is a plan view viewing an upper cover of the electric junction box in FIG. 1 from a bottom side thereof.

The upper cover 4 has a ceiling wall 7, a peripheral wall 8 as four outer walls linearly extending from each outer edge of the ceiling wall 7, and an inner wall 9 shown in FIG. 4. The inner wall 9 is located inward than the peripheral wall 8, and vertically extends from the ceiling wall 7. The inner wall 9 is located parallel to the peripheral wall 8 at intervals, and arranged along entire circumference of the outer edge of the ceiling wall 7 in the upper cover 4.

The lower cover 5 has a flat bottom wall 10, and a peripheral wall 11 as four outer walls linearly extending from each outer edge of the bottom wall 10. The bottom wall 10 has a hole not shown so as to insert a connector 26 described below.

One of four peripheral walls 8 has a notch 15 so as to put out a fuse 28 attached to a fuse plate 35 described below, and one of four peripheral walls 11 has a notch 16 so as to put out the fuse 28 attached the fuse plate 35.

The upper cover 4 and the lower cover 5 are positioned so that the ceiling wall 7 and the bottom wall 10 are arranged parallel to each other with a space. Then, the outer edge of the peripheral wall 8 is overlapped with the outside of the outer edge of the peripheral wall 11. Furthermore, the peripheral wall 11 is sandwiched between the peripheral wall 8 and the inner wall 9, and the peripheral walls 8 and 11, and the inner wall 9 are overlapped each other. As a result, the upper cover 4 and the lower cover 5 are engaged to each other. Also, the peripheral walls 8 and 11 and the inner wall 9 correspond to the wall in claims. At this time, the inner wall 9 is overlapped with the inner surface of the peripheral wall 11 of the lower cover 5. According to the embodiment, as shown in FIG. 4, the lower cover 5 includes a locking projection 17, and the upper cover 4 includes a locking step 18 as the locking receiving portion.

A plurality of the locking projections 17 are arranged in the outer surface of the peripheral wall 11 of the lower cover 5 with a space, and projects from the peripheral wall 11 of the lower cover 5. Furthermore, the locking projection 17 includes an inclined surface 19 arranged away from the bottom wall 10, and a vertical surface 20 arranged close to the bottom wall 10. The inclined surface 19 gradually inclines from the bottom wall 10 toward the outer surface of the peripheral wall 11. The vertical surface 20 is perpendicular to the outer surface of the peripheral wall 11.

A plurality of the locking steps 18 are arranged in the inner surface of the peripheral wall 8 of the upper cover 4 with a space, and formed in a dent shape. Furthermore, the locking step 18 is arranged from the center of the inner surface of peripheral wall 8 of the upper cover 4 in the thickness direction Z, and linearly extends in the thickness direction Z. Moreover, the locking step 18 includes a vertical surface 21 arranged away from the ceiling wall 7 and a parallel surface 22 arranged closed to the ceiling wall 7. The vertical surface 21 is arranged in the center of the peripheral wall 8 in the thickness direction Z, and perpendicular to the inner surface of the peripheral wall 8. The parallel surface 22 is arranged from the ceiling wall 7 to the vertical surface 21, and is parallel to the inner surface of the peripheral wall 8. Furthermore, the upper cover 4 has a hole so as to form by injection-molding the locking step 18. The hole 23 is positioned along with the locking step 18 in the thickness direction Z, and penetrates through the ceiling wall 7.

The locking projection 17 is entered into the locking step 18, and the vertical surfaces 20 and 21 are overlapped with each other. As a result, the locking projection 17 and the locking step 18 are engaged. In such a way, the locking projection 17 and the locking step 18 are locked together, and attached to each other.

Figure 6:
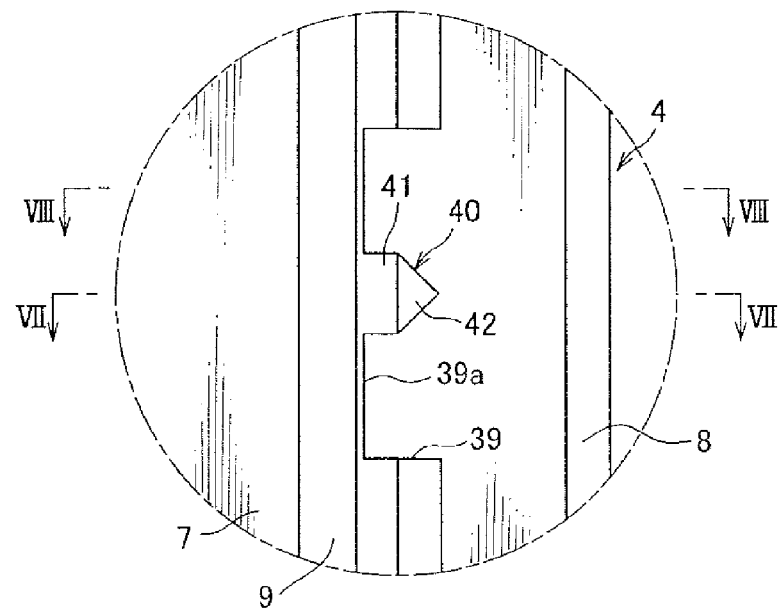
FIG. 6 is an enlarged plan view showing V section in FIG. 5.

Furthermore, as shown in FIG. 6, a thin portion 39 and a rattle absorption projection 40 are integrally formed in the inner wall 9 of the upper cover 4. The thin portion 39 is arranged in a plurality of inner walls 9 at intervals each other. Furthermore, the thin portion 39 is arranged along the surface of the inner wall 9 with a space against the locking step 18. moreover, the thin portion 39 is formed in a recess shape at the surface opposed to the peripheral wall 8 of the inner wall 9, and linearly extends along the thickness direction Z. The thickness of the inner wall 9 in the thin portion 39 is formed thinner than the thickness other than the thin portion 39 of the inner wall 9, and is maintained constant over the length and breadth of the thin portion 39.

Figure 7:
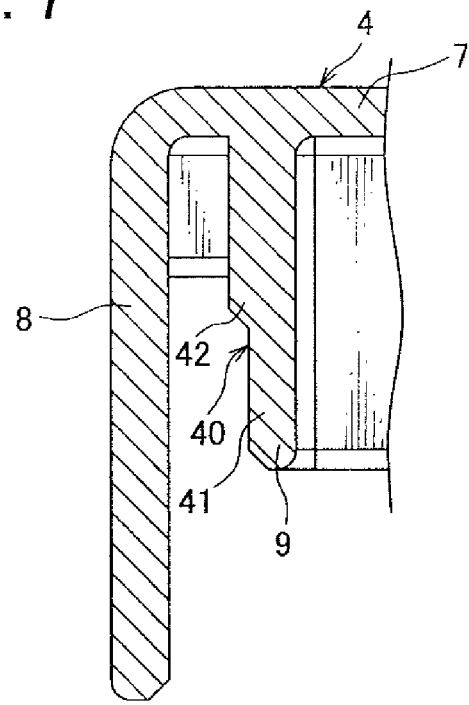
FIG. 7 is a cross-sectional view taken along the line VII-VII in FIG. 6.
Figure 8:
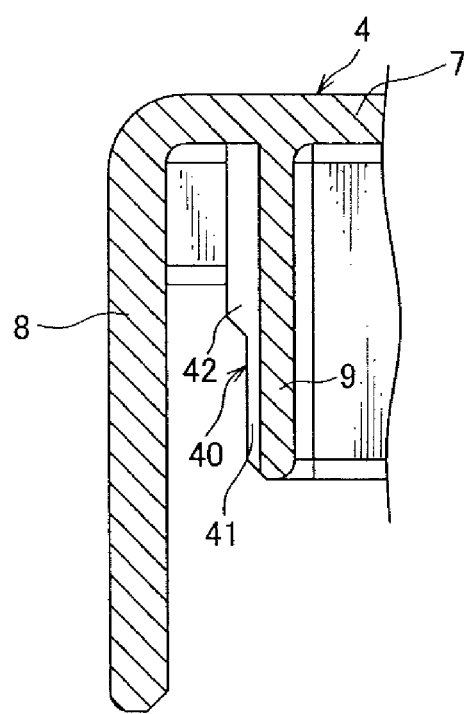
FIG. 8 is a cross-sectional view taken along the line VIII-VIII in FIG. 6.

The rattle absorption projection 40 projects from the bottom surface 39a opposed to the peripheral wall 8 of the thin portion 39. Furthermore, as shown in FIGS. 7 and 8, the rattle absorption projection 40 linearly extends along the thickness direction Z, and has a width uniform portion 41 and a tapered portion 42 together. The width uniform portion 41 projects from the bottom surface 39a of the thin portion 39, and is arranged over the entire length of the thin portion 39 in the thickness direction Z. The tapered portion 42 is connected to the tip away from the bottom surface 39a of the width uniform portion 41. The tapered portion 42 is arranged from the center of the width uniform portion 41 in the longitudinal direction to the end of the width uniform portion 41 close to the ceiling wall 7. Furthermore, the tapered portion 42 is formed so that the width thereof is gradually reduced with increasing distance from the bottom surface 39a of the thin portion 39, that is, toward the peripheral wall 8. In drawings, the tapered portion 42 is formed into a cone-shape toward the peripheral wall 8. The tapered portion 42 is formed so that the tip portion of the tapered portion 42 comes in contact with the peripheral wall 11 when the locking projection 17 is engaged with the locking step 18 as shown in a dashed line of FIG. 4. For this reason, when the locking projection 17 is engaged with the locking step 18, the tip portion of the tapered portion 42 is cut by the peripheral wall 11. As a result, the upper and lower covers 4 and 5 are prevented from becoming loose and faulty.

As shown in FIG. 3, the electric power distribution unit 3 has a metal substrate 24 as a printed-wiring board, a plurality of relays 25, a plurality of connectors 26, a fuse holding portion 27, and a plurality of fuses 28.

The metal substrate 24 has a metal plate 29, an insulating plate 30 which buries the metal plate 29 and is made of insulating synthetic resin, and a conductor pattern which is formed on the outer surface of the insulating plate 30. In, the metal substrate 24, a plurality of through holes penetrating through the both surfaces of the metal substrate 24 are arranged. The inner surface of the through hole is covered with synthetic resin constructing the insulating plate 30. The conductor pattern of the metal substrate 24 is electrically connected to each terminal of the connector 26, the relay 25 and the fuse 28 based on a predetermined pattern. The metal substrate 24 is received into the upper and lower covers 4 and 5 with a state in which the ceiling wall 7 is located parallel to the bottom wall 10 with a space. The metal substrate 24 is fixed to the lower cover 5 in the box main body 2 with screws 32 inserted into bosses arranged in the lower cover 5. In this manner, the metal substrate 24 is received in the lower cover 5, that is, the metal substrate 24 is received in the box main body 2, and the surface thereof is arranged along the horizontal direction. In the embodiment of the present invention, when the angle between the surface of the metal substrate 24 and the horizontal direction is a range of 0 degree to several dozen degree, it is described as "the surface of the metal substrate 24 is arranged along the horizontal direction".

The relay 25 is mounted on the metal substrate 24, and the terminal thereof is connected to the conductor pattern of the metal substrate 24. The connector 26 has an insulating connector housing 33 and a plurality of terminals 34 having conductive property. The connector housing 33 is attached to the metal substrate 24, and is exposed on the outside of the lower cover 5 in the box main body 2 through the hole passing through the bottom wall 10. The terminal 34 is maintained on the connector housing 33, and connected to the conductor pattern of the metal substrate 24. In one of connectors 26, the connector attached to the terminal of a supply cable is fitted. In the other connectors 26, the connector attached to the terminal of the wiring harness connected to various electronic devices of the vehicle is fitted.

As shown in FIG. 3, the fuse holding portion 27 has a fuse plate 35, a fuse terminal holder 36, and a plurality of conductive terminals 37. The fuse plate 35 is made of insulating synthetic resin, and a plurality of fuses 28 are attached to the fuse plate 35. The fuse plate 35 is attached to the upper and lower covers 4 and 5 so that the fuse plate 35 covers the notch 15 of the upper cover 4 and the notch of the lower cover 16, and the fuse 28 is exposed. The fuse terminal holder 36 is made of insulating synthetic resin, and attached to the fuse plate 35.

The terminal 37 of the fuse holding portion 27 is maintained in the fuse terminal holder 36, and connected to the fuse 28 attached to the fuse plate 35. The terminal 37 is connected to the conductor pattern of the metal substrate 24. The fuse holding portion 27 is mounted on the metal substrate 24 by connecting the terminal 37 to the conductor pattern of the metal substrate 24. The plurality of fuses 28 are attached to the fuse plate 35 of the fuse holding portion 27.

The electric power distribution unit 3 having the structure described above divides electric power form electric source with the conductor pattern of the metal substrate 24, and applies the electrical power to the fuse 28 and the relay 25, and then supplies the electric power from electric source to each electronic device.

The above electric junction box 1 has a plurality of brackets 38 so as to fix the upper and lower covers 4 and 5 of the box main body 2 in a body of the vehicle.

According to the embodiment of the present invention, the tapered portion 42 interfering with the peripheral wall 11 of the lower cover 5 is provided in the inner wall 9 of the upper cover 4. For this reason, when the upper cover 4 and the lower cover 5 are attached to each other, the tip portion of the tapered portion 42 is cut. Thus, the upper cover 4 and the lower cover 5 which are attached to each other can be prevented from becoming loose and faulty.

Furthermore, the tapered portion 42 is arranged in the bottom surface 39a. Therefore, when the upper cover 4 and the lower cover 5 are attached, the tip portion of the tapered portion 42 comes into contact with the peripheral wall 11 of the lower cover 5. As a result, the thin portion 39 is elastically deformed so that the bottom surface 39a is located away from the peripheral wall 11 of the lower cover 5. Thus, force required for approaching the upper cover to the lower cover 5 can be controlled. Furthermore, by arranging the tapered portion 42, the upper cover 4 can be easily attached to the lower cover 5.

Accordingly, the upper cover 4 can be smoothly attached to the lower cover 5, and abnormal noise can be prevented from occurring.

Furthermore, the thin portion 39 and the tapered portion 42 are arranged in the inner wall 9 not having the locking projection 17 and the locking step 18. For this reason, when the upper cover 4 is attached to the lower cover 5, the peripheral wall 8 having the locking step 18 and the peripheral wall 11 having the locking projection 17 can be prevented from being bent even if the tip portion of the tapered portion 42 comes into contact with the peripheral wall 11 of the lower cover 5. Thus, the overlapped portion in which the locking projection 17 and the locking step 18 are overlapped can be prevented from being reduced. In addition, the box main body 2 of the present invention can prevent the upper cover 4 and the lower cover 5 from accidentally separating.

The electric junction box 1 having the structure described above includes the above box main body 2. Therefore, when the upper cover 4 is attached to the lower cover 5, the tip portion of the tapered portion 42 is cut, and the thin portion 39 is elastically deformed so that the bottom surface 39a is arranged away from the peripheral wall 11 of the lower cover 5. Thus, the electric junction box 1 of the present invention can smoothly attach the upper cover 4 to the lower cover 5, and prevent abnormal noise from generating.

According to the embodiment of the present invention, the metal substrate 24 as the printed-wiring board is shown, but it is not limited thereto. For example, as the printed-wiring board, a printed-wiring board in which a conductor pattern is formed in an outer surface of the insulating substrate made of insulating synthetic resin may be used. Also, the thin portion 39 and the rattle absorption projection 40 may be arranged in the peripheral wall 11 of the lower cover 5.

The aforementioned preferred embodiments are described to aid in understanding the present invention and variations may be made by one skilled in the art without departing from the spirit and scope of the present invention.

What is claimed is:

1. A box main body having two cover members attached to each other comprising:
    a thin portion formed to be recessed as a part of an inner wall of one cover member, the wall being overlapped with a wall of the other cover member; and
    a plurality of tapered projecting from a bottom surface of the thin portion of the one cover member toward the wall of the other cover member, and gradually tapering toward the wall of the other cover member,
    wherein a tip portion of each of the plurality of tapered portions is cut when the one cover member and the other cover member are attached each other.

2. The box main body according to claim 1, wherein the thin portion and the tapered portion are arranged in the inner wall of the one cover member, and the wall of the other cover member is sandwiched between the inner wall of the one cover member and an outer wall of the one cover member.

3. An electric junction box comprising:
    the box main body described in claim 1; and
    an electric power distribution unit received in the box main body.

4. An electric junction box comprising:
    the box main body described in claim 2; and
    an electric power distribution unit received in the box main body.

* * * * *